United States Patent
Zaneboni et al.

(10) Patent No.: US 9,302,779 B2
(45) Date of Patent: Apr. 5, 2016

(54) AIRCRAFT COCKPIT WITH AN ADJUSTABLE ERGONOMIC INSTRUMENT PANEL

(71) Applicant: AIRBUS SAS, Blagnac (FR)

(72) Inventors: Jason Zaneboni, Blagnac (FR); Bruno Saint-Jalmes, Toulouse (FR)

(73) Assignee: AIRBUS SAS, Blagnac (FR)

( * ) Notice: Subject to any disclaimer, the term of this patent is extended or adjusted under 35 U.S.C. 154(b) by 8 days.

(21) Appl. No.: 14/138,533

(22) Filed: Dec. 23, 2013

(65) Prior Publication Data

US 2014/0175222 A1    Jun. 26, 2014

(30) Foreign Application Priority Data

Dec. 21, 2012  (FR) ..................... 12 62645
Dec. 21, 2012  (FR) ..................... 12 62661
Sep. 30, 2013  (FR) ..................... 13 59414

(51) Int. Cl.
  *B64D 11/00* (2006.01)
  *B64D 43/00* (2006.01)

(52) U.S. Cl.
  CPC .............. *B64D 43/00* (2013.01); *B64D 11/00* (2013.01); *Y02T 50/46* (2013.01)

(58) Field of Classification Search
  CPC ............................. B64D 43/00; B64D 11/00
  USPC ................. 244/118.5, 118.6, 129.1
  See application file for complete search history.

(56) References Cited

U.S. PATENT DOCUMENTS

| | | | |
|---|---|---|---|
| 5,240,207 A | 8/1993 | Eiband et al. | |
| 5,875,997 A | 3/1999 | Al-Sabah | |
| 6,450,828 B1* | 9/2002 | Gordon | 439/347 |
| 2004/0169663 A1 | 9/2004 | Bernier | |
| 2004/0172896 A1 | 9/2004 | Steed et al. | |
| 2008/0179457 A1 | 7/2008 | Guering | |
| 2008/0223984 A1 | 9/2008 | Guering | |
| 2010/0148002 A1* | 6/2010 | Park et al. | 244/118.5 |
| 2011/0084106 A1* | 4/2011 | Bopp et al. | 224/563 |
| 2012/0056442 A1 | 3/2012 | Stimel et al. | |
| 2013/0148325 A1* | 6/2013 | Guering | 361/809 |
| 2014/0346296 A1* | 11/2014 | Tschann et al. | 248/221.11 |

FOREIGN PATENT DOCUMENTS

| | | |
|---|---|---|
| DE | 101 45 261 | 4/2003 |
| EP | 0 980 828 | 2/2000 |
| EP | 1 453 009 | 9/2004 |
| FR | 2 903 661 | 1/2008 |

(Continued)

OTHER PUBLICATIONS

French Search Report dated Mar. 14, 2014 in FR 1359414.

(Continued)

*Primary Examiner* — Christopher P Ellis
*Assistant Examiner* — Richard G Davis
(74) *Attorney, Agent, or Firm* — Nixon & Vanderhye P.C.

(57) ABSTRACT

The invention concerns an aircraft cockpit comprising at least one instrument panel (4) and a seat (2) for a pilot characterized in that the instrument panel forms a single unit and is carried by a hinged support (6) enabling the pilot to adjust the position of the instrument panel (4) relative to the pilot seat (2). Preferably, the instrument panel forms a single unit and is curved, for example along the arc of a circle, around the pilot seat.

13 Claims, 2 Drawing Sheets

(56) References Cited

FOREIGN PATENT DOCUMENTS

| | | |
|---|---|---|
| FR | 2 905 929 | 3/2008 |
| WO | WO 2012/025695 | 3/2012 |

OTHER PUBLICATIONS

Search Report for FR 1262645, dated Aug. 2, 2013.
Search Report for FR 1262661, dated Jul. 31, 2013.

* cited by examiner

AIRCRAFT COCKPIT WITH AN ADJUSTABLE ERGONOMIC INSTRUMENT PANEL

This application claims priority to FR Application No. 1262645 filed Dec. 21, 2012, FR Application No. 1262661 filed Dec. 21, 2012 and FR Application No. 1359414 filed Sep. 30, 2013, the entire contents of each of which are hereby incorporated by reference.

The invention concerns a cockpit for a civil transport aircraft, that is to say for a commercial aircraft transporting passengers, their baggage and/or goods. The cockpit is the space reserved for the pilots. It contains all the controls (controls for actuating control surfaces, lift-increasing flaps and the like, controls for actuating the landing gear, the engines, the air-brakes, etc.) and the instruments necessary for piloting the aircraft.

The on-board instruments serve to present the crew and in particular the pilot with all the information useful for maintaining the flight of the aircraft, for navigation and for communications with the air traffic control infrastructures. For the pilot, the instruments are grouped together on the instrument panel situated in front of him.

Initially, the on-board instruments were grouped together according to their function, possibly in the vicinity of the corresponding commands, and their arrangement, although variable from one aircraft to another, generally complied with certain standards.

On the most recent aircraft, the instruments are replaced by screens enabling the data supplied by the instruments to be displayed. By way of example, an aircraft known under the name of Airbus® A380® includes eight liquid crystal screens of 15×20 cm, and six screens of 15×15 cm equip the A320®, A330® and A340®. The screens are most often multifunctional, that is to say that they are provided to display all the information for a phase of flight at the pilot's will.

Originally, the screens reproduced the conventional views of the analog instruments identically. They have been progressively replaced by visuals grouping together the information on the basis of more ergonomic presentations, and recent instrument panels increasingly resemble computers with windows and a mouse. This evolution has been rendered necessary by the ever increasing quantity of data that pilots must analyze and has been facilitated by the advent (increasing performance and reliability, miniaturization, etc.) of digital systems. It has furthermore enabled displays to be provided that are much richer and more varied, for example such as a three-dimensional flight plan.

Suppliers can respond more individually to the desires of users and custom-create solutions. Numerous characteristics of the new instruments improve the man-machine interface and thus safety and efficiency.

The constant preoccupations of aircraft manufacturers in the development of cockpits (CDS display systems and environment) are not only the workload of the pilot, but also his comfort.

To be precise, piloting and the heavy responsibility it involves in terms of human lives induce a major component of stress known by the term "human factor". Moreover, experience has shown that the stress, nerves, and also fatigue, or even the bad mood of a pilot may alter his judgment, his receptiveness, his capacity to work in a team or to take decisions.

The invention is directed to improving safety by providing a new cockpit that is more comfortable for the pilot and which is equipped with a more ergonomic instrument panel. The invention is also directed to facilitating the installation of the pilot in the cockpit and in particular the operation of setting his line of sight.

Another objective of the invention is to solve these technical problems while limiting the impact of the new cockpit on the structure of the aircraft and on the manufacturing cost thereof. In particular, the mass of the aircraft must not be increased.

For this, the invention provides an aircraft cockpit comprising at least one instrument panel and a seat for a pilot, characterized in that the instrument panel forms a single unit and is carried by a hinged support enabling the pilot to adjust the position of the instrument panel relative to the pilot's seat.

Thus, in a cockpit according to the invention, the pilot can take his place on his seat preferably after having raised the instrument panel (see later), adjust it (how far forward, inclination of the back-rest, height, etc.) so as to set his line of sight on a reference axis and optimize his comfort independently of any constraint and in particular of his position relative to the instrument panel; he may then adjust the position of the instrument panel (height, orientation) relative to the position of reference and comfort found. By contrast, in all the prior cockpits, it is the seat which adjusts relative to the instrument panel with smaller degrees of freedom and amplitudes, so limiting the pilot's comfort. Furthermore, the access to the seat may be facilitated in a cockpit according to the invention as explained below. Furthermore, the instrument panel forming a single unit results in a weight saving (that is to say reduction).

In all that follows, "reference axis" of the cockpit means an axis on which the pilot must set his line of sight when he is in piloting position, seated on the pilot seat. This reference axis is preferably substantially horizontal (when the aircraft is observed on the ground) and is for example substantially at right angles to the back-rest of the pilot's seat in upright piloting position. The terms "reference plane" designate a vertical plane containing the reference axis, in other words a vertical plane centered on the pilot in piloting position.

According to a possible embodiment, the reference axis is parallel to a longitudinal direction of the aircraft, in order for the pilot to be installed in the "direction of travel" and to experience the same sensations as in a conventional cockpit. This does not exclude the possibility of disposing the reference axis otherwise in particular in the case explained later in which the viewing surface for piloting is at least partially virtual.

According to a possible embodiment, the hinged support of the instrument panel comprises a pivotal link, preferably at right angles to the reference plane enabling the instrument panel to be raised so as to facilitate the access to the pilot's seat (as the instrument panel forms a single unit, when it is in raised position the entire space extending forward of the pilot's seat is cleared to enable the installation of the pilot) and enabling adjustment of its height relative to a sitting surface of the pilot's seat. This pivotal link is for example situated in a lower part of the hinged support.

It is also possible to provide for the hinged support to comprise a ball joint or a second pivotal link enabling the orientation of the instrument panel to be adjusted independently of its height. This ball joint is for example situated in an upper part of the hinged support. In the absence of such a ball joint (or pivot), the orientation of the instrument panel is adjusted by virtue of the lower pivotal link defined above, but it is linked to the height of the instrument panel.

The hinged support comprises a slide link along an axis included in the reference plane, referred to as the advancement axis of the instrument panel, and which is not vertical For example, the advancement axis of the instrument panel forms an age of 10° to 40° with the reference axis, in the reference plane. This slide link makes it possible to move the instrument panel rearward (closer) or forward (further away) relative to the pilot's seat, according to the height of the pilot.

In an embodiment, the instrument panel is bowed or curved around the pilot's seat.

In an embodiment, the instrument panel follows substantially an arc of a circle around the pilot's seat. This feature is considered to cover the case of an instrument panel bowed or curved into an arc of a circle and that of an instrument panel formed from a succession of contiguous planar panels disposed along a broken line approximating the arc of a circle.

The disposition in an arc of a circle around the pilot improves the view the pilot has of the different information delivered to the instrument panel, and thereby improves safety.

Thus, by virtue of its shape in the arc of a circle, every point of the instrument panel is accessible to the pilot without him having move from his seat; provided that the radius of that arc of a circle is less than the average length of an upper human limb (arm+forearm). This inherent and effort-free accessibility of the instrument panel contributes to the comfort of the cockpit according to the invention. In a preferred embodiment, the instrument panel in an arc of a circle further comprises one or more of the following features:

- The circle arc followed by the instrument panel has a radius comprised between 80 cm and 150 cm.
- The circle arc followed by the instrument panel is centered on a point of the reference plane at least when it is in a lowered operational position.
- At least when it is in a lowered operational position, the instrument panel is symmetrical relative to the reference plane; it then extends as much on one side as on the other of the reference plane, that is to say as much to the right as to the left of the pilot. When not in the lowered operational position, it is not excluded, for example if the hinged support comprises an upper ball joint, for the instrument panel to be situated in a position in which its center is outside the reference plane for example to facilitate the access to the pilot's seat still more.
- The hinged support comprises a bent rigid arm of ogival shape, having a lower bend extended by pivotal link and two upper ends linked to the instrument panel.

Advantageously and according to the invention, the pilot's seat is mounted on a rack slide enabling the seat to be displaced along the reference axis. In usual manner, the cockpit preferably comprises rudder pedals (flight control by which the pilot acts on the directional control surfaces and can perform rotation of the aircraft around its axis of yaw). Said pedals are disposed here forward of the rack slide on opposite sides of the reference plane. The rack slide thus makes it possible to adjust the advancement of the pilot's seat relative to the rudder pedals, according to the height of the pilot. It is to be noted that the rudder pedals may be operational and movably mounted around a pivotal axis which is preferably at right angles to the reference plane, or, conversely, be disabled (temporarily or permanently) so as not to control the directional control surfaces (the control in that case being fully electrical, the rudder pedals then only being a component for comfort serving as a support for the pilot's feet). When they are disabled, it may be provided to enable the rudder pedals to be locked in a fixed position or to leave them movable about the aforementioned pivotal axis.

Advantageously according to the invention, the instrument panel comprises a touch screen covering a major part, and preferably the entirety, of its surface. The expression "a screen" here equally well designates a continuous display surface as a plurality of separate display surfaces.

In usual manner, a cockpit comprises a surface, referred to as viewing surface for piloting, giving at least one pilot a view of an outside scene comprising the environment of the aircraft extending forward of the aircraft. In a conventional aircraft, that viewing surface for piloting is formed by a windshield assembly. The inventors have recently provided that it be at least partly formed by means for displaying a digital image representing at least part of an outside scene comprising the environment of the aircraft extending flowing of the aircraft, those display means comprising for example a screen and associated projection means, and/or a laser device for forming a holographic image. In other words, at least part of the outside scene as viewed by the pilot is a virtual reconstitution of the real environment of the aircraft.

The invention also concerns a cockpit characterized in combination by all or some of the features described above and below.

The invention includes an aircraft for transporting passengers or transporting goods, characterized in that it comprises a cockpit as described above.

Other details and advantages of the present invention will appear from the reading of the following description, which refers to the diagrammatic appended drawings and which relates to preferred embodiments, provided by way of non-limiting examples. In the drawings.

Figure 1:
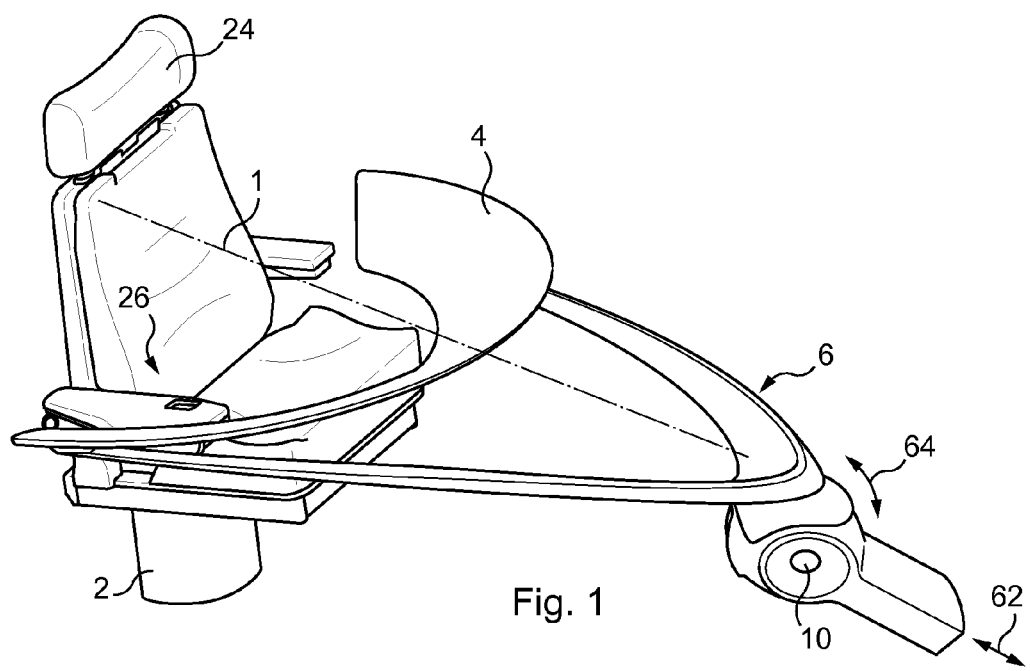
FIG. 1 is a diagrammatic view in perspective of an instrument panel and of a pilot seat of a cockpit according to the invention.
Figure 2:
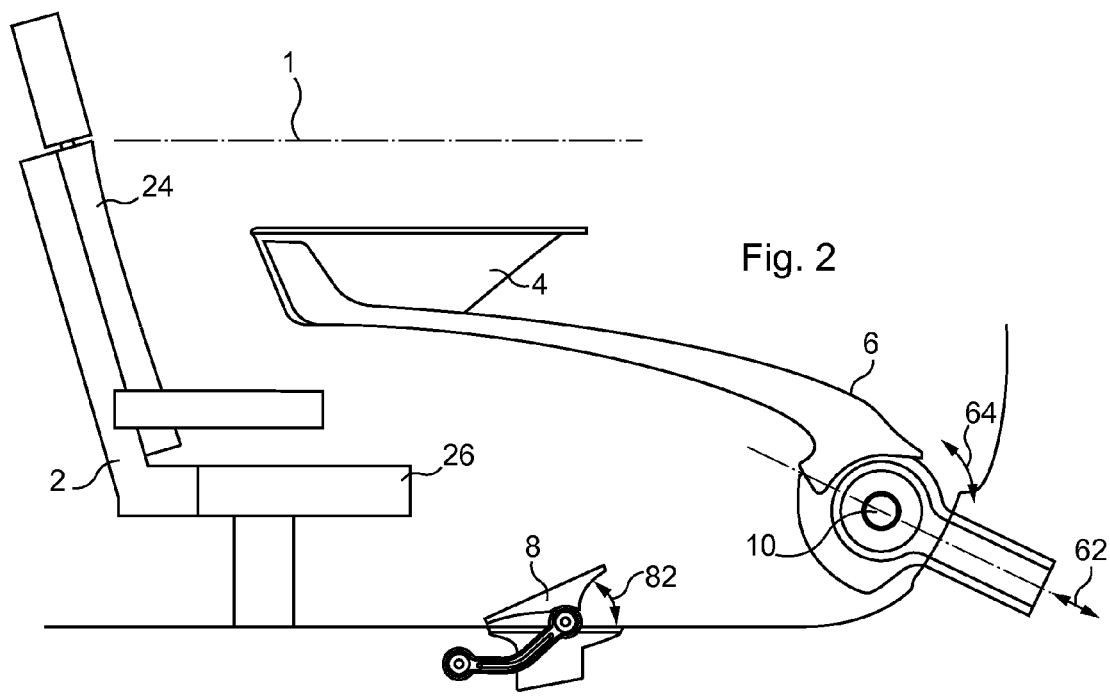
FIG. 2 is a diagrammatic side elevation view of the instrument panel and of the pilot seat of FIG. 1, the seat being in an upright operational position.

The example of the cockpit according to the invention illustrated in FIGS. 1 and 2 comprises a pilot seat 2 and an instrument panel 4. In usual manner, the pilot seat 2 comprises a sitting surface 26 and a back-rest 24 that is pivotable between an upright piloting position and a resting position inclined rearward.

To facilitate the description of this cockpit, a reference axis 1 is defined which corresponds to the line of sight of the pilot who is installed in the pilot seat 2 in upright piloting position as illustrated in FIGS. 1 and 2. When the seat is thus in an upright position, the reference axis is substantially at right angles to the back-rest 24.

A reference plane is also defined containing the reference axis 1 and a vertical axis; this plane is parallel to the plane of the sheet of FIG. 2.

According to an embodiment, the reference axis 1 is substantially parallel to a longitudinal axis of the aircraft; the pilot seat 2 then has an orientation similar to that of a pilot seat of a conventional cockpit and the pilot feels the same sensations as in an aircraft of the prior art.

Figure 3:
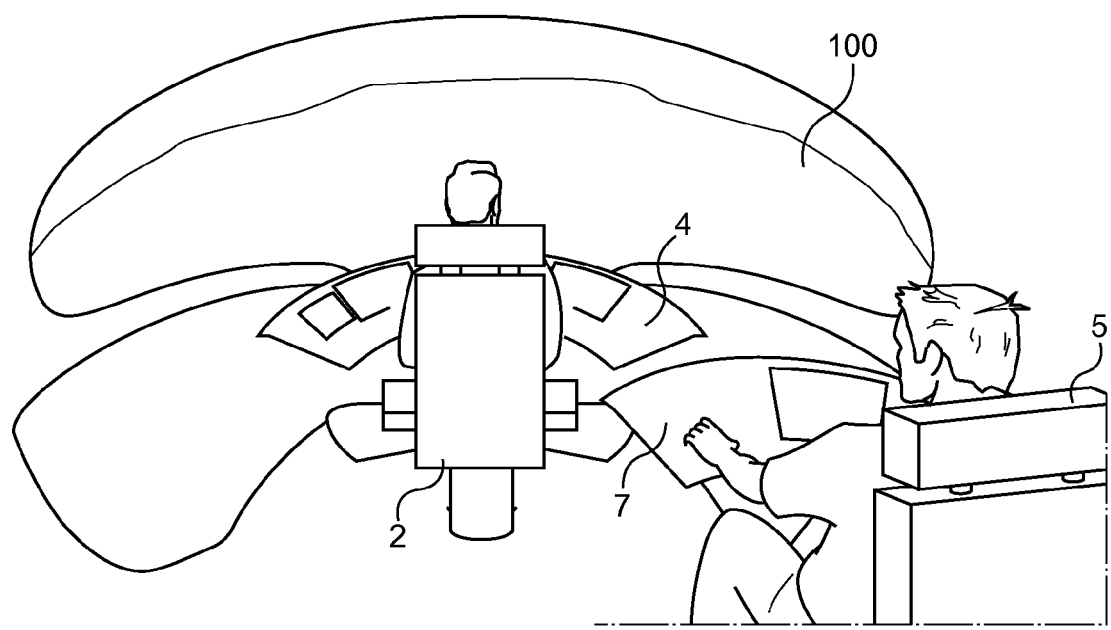
FIG. 3 is a diagrammatic rear elevation view of the cockpit of FIGS. 1 and 2 further comprising a seat and an instrument panel for a copilot.

According to a possible embodiment, contrary to conventional cockpits, the pilot seat 2 is positioned substantially at the center of the cockpit and the reference plane divides the cockpit into two parts of substantially the same volume. If the pilot is assisted by a copilot, the latter can take his place on a copilot seat 5 advantageously arranged rearward and offset to the side relative to the pilot seat 2; this arrangement is qualified as an arrangement in tandem with a lateral offset; it is illustrated in FIG. 3. The copilot preferably has at his disposition an adjustable ergonomic instrument panel 7 similar to the pilot's instrument panel 4. The cockpit illustrated in FIG.

3 further comprises a viewing surface 100 for piloting which is at least partially virtual, such as that disclosed by the applications FR-12 62645 and FR-12 62661 incorporated herein by reference.

The cockpit also comprises rudder pedals 8 which are preferably movable in the direction of arrow 82 around a pivotal axis at right angles to the reference plane, whether they are operational (that is to say capable of controlling directional control surfaces of the aircraft) or whether they are disabled (their actuation in that case leading to no change in direction of the aircraft; the controls for the directional control surfaces then being fully electric). The pilot seat 2 is mounted on a slide rack (not visible in the drawings) extending substantially parallel to the reference axis 1 in order to be able to adjust the distance between the pilot's seat and the rudder pedals 8 according to the length of the pilot's legs. However, the length of that slide rack is preferably limited (of the order of 10 to 20 cm for example) in order to limit the bulk of the cockpit as well as its impact on the mass of the aircraft.

The instrument panel 4 is mounted on a hinged support 6. The instrument panel according to the invention is curved and preferably has two curvatures: a first curvature in a horizontal plane (when the panel is observed in a lowered operational position) so as to surround the pilot seat 2 in order for the pilot to have easy access to all the buttons of the instrument panel; a second curvature in the reference plane, the effect of which is to bring the top of the instrument panel nearer to the pilot. The two curvatures thus enable the pilot to be as close as possible to the whole of the surface of the instrument panel while providing a surface for viewing the instruments that is adequate relative to the positioning of the pilot. The instrument panel 4 is thus concave for better visibility and better accessibility. In the illustrated example, the instrument panel 4 forms a single unit and each of the two curvatures referred to earlier follows an arc of a circle of which the center is in the reference plane, such that the instrument panel is a portion of a sphere (of which the center is in the reference plane). What is more, the instrument panel 4 illustrated, in the form of a portion of a sphere, is arranged so as to be symmetrical relative to the reference plane.

The hinged support 6 comprises, in a lower part thereof, a slide link enabling the instrument panel to be moved rearward or forward in the direction of the arrow 62 in order to be able to set the distance between the instrument panel and the pilot's seat in the reference plane, in particular in the reference direction, according to the height of the pilot. It is to be noted that, in the reference plane, the direction of the arrow 62 forms an angle with the (horizontal) reference axis 1, which is of the order of 30° for the illustrated non-limiting example.

The hinged support 6 further comprises, also in a lower part thereof, a pivotal link 10 enabling the instrument panel 4 to be raised and lowered in the direction of the arrow 64. In raised position, the instrument panel 4 no longer hinders the access to the pilot seat 2 and the pilot can easily take his place on his seat then adjust the position of the seat, in particular in the direction of reference relative to the rudder pedals 8, but also in terms of height and inclination of its back-rest 24 not only in order to find a comfortable position, but also and especially to set his line of sight on the reference axis. Once the position has been found, the pilot can lower the instrument panel 4 by pivoting the hinged support 6 around the pivotal link 10 in the direction of the arrow 64 until the instrument panel is at a height that is satisfactory for the pilot (depending on his morphology).

It may be noted that an upper part of the hinged support 6 situated above the pivotal link 10 has a shape cut out in an ogive. In other words, the hinged support 6 comprises a rigid arm crooked at an elbow capping the pivotal link 10, which rigid arm has an outside contour shaped like an ogival warhead. This rigid arm takes up the loads from the instrument panel at its ends to transmit them to a load-bearing structure of the aircraft fuselage. Its ogival shape, which is reminiscent of the nose of an aircraft, can be used as a spatial reference and thereby facilitate the aforementioned setting operation (setting of the pilot's line of site on the reference axis). Furthermore, this ogival shape leaves more space for the pilot's knees.

Locking means for the hinged support (not shown) may be provided to fix the support in the desired position. Means for storing that position in memory with an identifier of the pilot may also be provided to facilitate and accelerate any later installation.

The curved instrument panel 4 is preferably constituted by a touch screen. Given the shape and the optimal positioning of the instrument panel 4, any point of the screen is easily accessible to the pilot comfortably installed in his seat. The pilot may thus easily modify the display on the screen at will, without moving his seat.

The cockpit according to the invention may be the object of numerous variants relative to the embodiment described and illustrated in the appended drawings, provided those variants remain within the scope delimited by following claims.

For example, it is possible for the instrument panel not to be curved and to be composed of several contiguous planar panels successively arranged along an arc of a circle (for example centered on the reference plane) or along any other curve. It may, as a variant, be bowed or curved but without following an arc of a circle.

Furthermore, the hinged support may comprise a straight rigid arm (in contrast to the bent arm illustrated) on opposite sides of which the pilot may stretch out his legs, which rigid arm could be hinged in a lower part thereof to a load-bearing structure of the fuselage by a first pivotal link as described for the illustrated bent arm and, in an upper part thereof by a second pivotal link at the location of the junction between the instrument panel and the support to enable the orientation of the instrument panel to be adjusted independently of its height. The bent arm illustrated is however preferred since it takes up the loads from the instrument panel at two spaced-apart points and ensures greater stability (with fewer vibrations) of the instrument panel.

The invention claimed is:

1. An aircraft cockpit comprising:
   at least one instrument panel, and
   a seat for a pilot,
   the instrument panel being curved to facilitate access to all of the instrument panel by the pilot when sitting in the pilot seat, and
   a hinged support carrying the instrument panel so as to enable the pilot to adjust the position of the instrument panel relative to the pilot seat.

2. The cockpit according to claim 1, wherein the hinged support comprises a pivotal link enabling the instrument panel to be raised so as to facilitate the access to the pilot's seat and enabling adjustment of the instrument panel's height relative to a sitting surface of the pilot's seat.

3. The cockpit according to claim 1, wherein the instrument panel, observed in a lowered operational position, comprises a first curvature in a horizontal plane so as to surround the pilot seat.

4. The cockpit according to claim 3, wherein the instrument panel follows substantially an arc of a circle around the pilot seat.

5. The cockpit according to claim 4, including a reference axis and a reference plane containing said reference axis and a vertical axis, wherein the circle arc followed by the instrument panel is centered on a point of the reference plane at least when it is in a lowered operational position.

6. The cockpit according to claim 1, including a reference axis and a reference plane containing said reference axis and a vertical axis, wherein the instrument panel comprises a second curvature in the reference plane.

7. The cockpit according to claim 1, including a reference axis and a reference plane containing said reference axis and a vertical axis, and wherein the reference axis is parallel to a longitudinal direction of the aircraft.

8. The cockpit according to claim 1, including a reference axis and a reference plane containing said reference axis and a vertical axis, wherein the pilot's seat is mounted on a rack slide enabling the pilot's seat to be displaced along the reference axis.

9. The cockpit according to claim 8 further comprising rudder pedals, that are disposed forward of the rack slide on opposite sides of the reference plane.

10. An aircraft for transporting passengers or transporting goods comprising a cockpit according to claim 1.

11. An aircraft cockpit comprising:
   at least one instrument panel, and
   a seat for a pilot,
   the instrument panel forming a single unit and being carried by a hinged support enabling the pilot to adjust the position of the instrument panel relative to the pilot seat,
   the hinged support comprising a pivotal link enabling the instrument panel to be raised so as to facilitate the access to the pilot's seat and enabling adjustment of its height relative to a sitting surface of the pilot's seat, and
   the hinged support comprising a bent rigid arm of ogival shape, having a lower bend extended by pivotal link and two upper ends linked to the instrument panel.

12. An aircraft cockpit comprising:
   at least one instrument panel, and
   a seat for a pilot,
   the instrument panel forming a single unit and being carried by a hinged support enabling the pilot to adjust the position of the instrument panel relative to the pilot seat, and
   a reference axis and a reference plane containing said reference axis and a vertical axis,
   the hinged support comprising a slide link along an advancement axis of the instrument panel included in the reference plane and which is not vertical.

13. The cockpit according to claim 1, wherein the instrument panel forms a single unit which is curved.

* * * * *